United States Patent [19]
Darcie et al.

[11] Patent Number: 4,842,368
[45] Date of Patent: Jun. 27, 1989

[54] N×N SINGLE-MODE OPTICAL WAVEGUIDE COUPLER

[75] Inventors: Thomas E. Darcie, Hazlet; Adel A. M. Saleh, Holmdel, both of N.J.

[73] Assignees: American Telephone and Telegraph Company, New York, N.Y.; AT&T Bell Laboratories, Murray Hill, N.J.

[21] Appl. No.: 85,924

[22] Filed: Aug. 17, 1987

[51] Int. Cl.[4] .......................... G02B 6/26; G02B 6/42
[52] U.S. Cl. ................................................. 350/96.15
[58] Field of Search ...................................... 350/96.15

[56] References Cited

U.S. PATENT DOCUMENTS

| | | | |
|---|---|---|---|
| 4,262,993 | 4/1981 | Burns et al. | 350/96.14 |
| 4,515,428 | 5/1985 | Findakly | 350/96.12 |
| 4,533,208 | 8/1985 | Stowe | 350/96.16 |
| 4,556,279 | 12/1985 | Shaw et al. | 350/96.15 |
| 4,749,248 | 6/1988 | Aberson et al. | 350/96.15 |

OTHER PUBLICATIONS

Slonecker, M. H., et al., "Recent Advances in Single-Mode Fused Taper Coupler Technology", Proceedings of SPIE, vol. 412, 1983, pp. 50-53.
Marhic, M. E., "Hierarchic & Combinatorial Star Couplers", Optics Letters, vol. 9, No. 8, Aug. 2984, pp. 368-370.
Marhic, M. E., "Combinatorial Star Couplers for Single-Mode Optical Fibers," Proceedings: papers presented at the Eighth Intl. Fiber Optic Comm. and LAN Expo, 1984, pp. 175-177.
Wang et al., "9×9 Single-Mode Fiber-Optic Star Couplers", Optics Letters, vol. 10, No. 1, Jan. 1985, pp.49-51.
Doldissen et al., "Integrated-Optical 8×8 Star Coupler in Ti:LiNbO" Integrated Optics, Proc. of Third Euro. Conf. ECIO'85, 1985, pp. 225-228.
Nelson, A., "Review of Single Mode Coupler Technology & Applications", Proc.: papers presented at the Ninth Intl. Fiber Optic Comm. & LAN Expo in U.S.A. 1985, pp. 227-231.
Agarwal, A. K., "Review of Optical Fiber Couplers", Fiber and Integrated Optics, vol. 6, No. 1, 1987, pp. 27-51.
Yariv, A., Optical Electronics, Third Edition, Holt, Rinehart & Winston, 1985, pp. 437-442.

Primary Examiner—William L. Sikes
Assistant Examiner—Robert E. Wise
Attorney, Agent, or Firm—Erwin W. Pfeifle

[57] ABSTRACT

The present invention relates to a N×N single-mode optical coupler employing evanescent wave coupling between mutually adjacent optical waveguides sufficiently close to one another to facilitate coupling among all the waveguides. An optical signal of a narrow frequency band, e.g. appreciably less than 100 gigahertz, introduced to an input port of one of the waveguides is found to be nonuniformly distributed among the output ports of the coupler. A first embodiment uses the nonuniform distributions of narrowband optical signals to the output ports of the coupler to enable the present invention to be used as essentially a selective switching device. A second embodiment introduces one or more predetermined broadband optical signals to one or more input ports of the coupler to produce an appreciably uniform power distribution among the output ports of the coupler. A third embodiment uses electrooptic or magnetooptic waveguides and the application of a high-frequency, continuously changing magnitude, oscillatory electric or magnetic field, respectively, throughout the coupling region of the waveguides to produce a substantially uniform power distribution among the output ports of the coupler for a narrowband optical signal applied to an input port of the coupler.

10 Claims, 2 Drawing Sheets

N×N SINGLE-MODE OPTICAL WAVEGUIDE COUPLER

TECHNICAL FIELD

The present invention relates to N×N evanescent wave optical star coupling devices, and more specifically, to single-mode optical waveguide star couplers.

DESCRIPTION OF THE PRIOR ART

In optical systems, information in the form of an optical signal may need to be divided into a plurality of equally powerful optical signals. Transmissive star couplers are used to divide signals in such a manner, and current designs of star couplers seek to provide an equal division of light signls without experiencing considerable power loss.

The basis of many larger N×N star coupler designs is 2×2 and 3×3 single-mode optical waveguide couplers which are of considerable importance in single-mode optical waveguide star coupler technology. Two methods of fabricating 2×2 or 3×3 single-mode couplers are the fusion process and the chemical etching process as described in "Recent Advances in Single-Mode Fused Taper Coupler Technology" by M. H. Slonecker et al. in *Proceedings of SPIE*, 1983, volume 412, pp. 50-53, and in "Review of Optical Fiber Couplers" written by A. K. Agarwal in volume 6, number 1 of *Fiber and Integrated Optics* 1987, pp. 29-33. However, disadvantages exist with both of these processes. The fusion fabrication process is stated to be highly labor intensive, a result of the relatively low-yield rate in manufacturing these couplers, according to the article "Review of Single Mode Coupler Technology and Applications" by A. Nelson in *Proceedings: Paper Presented at the Ninth International Fiber Optic Communication and Local Area Networks Exposition in the USA* Sept. 18-20, 1985, pp. 227-231. Within this same article, the chemical etching technique is stated to produce couplers that have environmentally unstable operation. These problems limit the widespread use of fused and chemically etched couplers.

Large N×N single-mode optical waveguide star couplers are needed and are currently being produced by cascading stages of smaller 2×2 or 3×3 couplers. An example of the cascading method is FIG. 1 of the article "9×9 Single-Mode Fiber-Optic Star Couplers" by C. C. Wang et al. in *Optics Letters*, volume 10, number 1, January 1985, pp. 49-51, in which 3×3 single-mode couplers are displayed in a cascaded design to form a 9×9 star coupler. The complexity of designing a large N×N star coupler by the method of cascading smaller star couplers increases as the number of ports of the star coupler increases. Even formal methods have been documented which describe how to interconnect smaller star couplers to produce arbitrarily large N×N single-mode star couplers with low power loss, e.g. "Hierarchic and Combinatorial Star Couplers" by M. E. Marchic in *Optics Letters*, August 1984, volume 9, number 8, pp. 368-370.

The problem remaining in the prior art is to provide a simpler approach in designing and fabricating large N×N single-mode star couplers.

SUMMARY OF THE INVENTION

The problem in the prior art has been solved in accordance with the present invention which relates to a single-mode optical waveguide coupler including an arrangement of optical waveguides, the arrangement facilitating coupling among all the waveguides. When a narrow frequency band optical signal is applied to an input port of this coupler, the power of the input signal is found to be nonuniformly distributed to the output ports of the coupler. This nonuniform output power level distribution is made uniform, in accordance with the present invention, by causing the components of the input signal of the coupler to experience both different propagation constants throughout, and different coupling coefficients between, the waveguides by either the application of a high-frequency, continuously changing magnitude, oscillatory electric or magnetic field or the introduction by each user of a predetermined broadband optical signal to the associated input port of the coupler. Also, the nonuniform output power distribution can be used to an advantage by introducing a predetermined narrow frequency band optical signal into a selected waveguide input port to achieve a distinct varied output power level distribution for purposes of selective switching of the input signal to certain output ports of the coupler.

DETAILED DESCRIPTION

Figure 1:
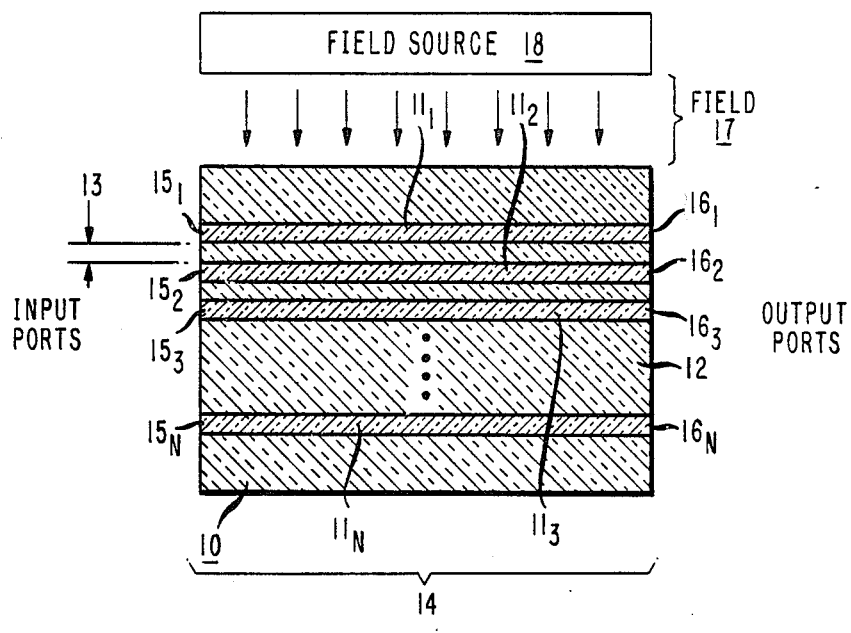
FIG. 1 illustrates the preferred design of a coupler in accordance with the present invention showing the planar parallel arrangement and spacing of a plurality of N optical waveguides on a substrate.
Figure 3:
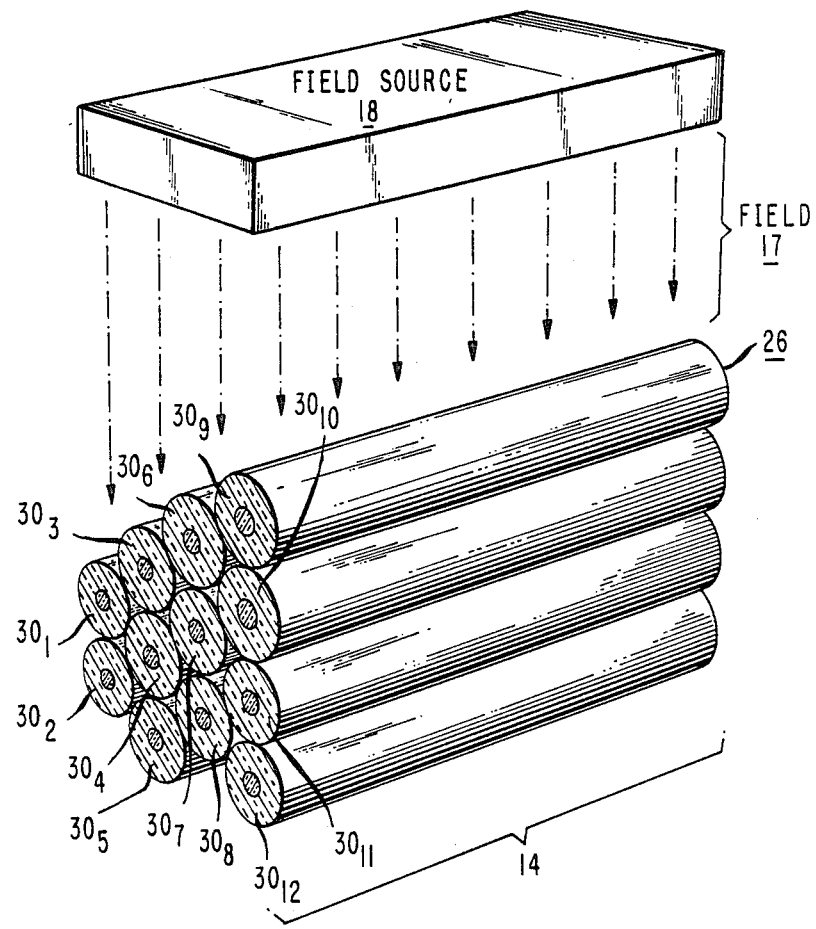
FIG. 3 illustrates an alternate design of a coupler in accordance with the present invention in which a plurality of optical waveguides are arranged in a bundle.

Numerous single-mode optical waveguide coupler designs in accordance with the present invention are possible, two of which are coupler 10 of FIG. 1 and coupler 26 of FIG. 3. Referring to FIG. 1, coupler 10, the preferred coupler design of an N×N single-mode optical waveguide coupler, is shown as including a planar arrangement of N mutually parallel optical waveguides $11_1$–$11_N$ embedded in a substrate 12 having a predetermined refractive index less than that of the waveguide material. A planar arrangement of waveguides is preferable because of the relative ease in the manufacturing process as compared to the nonplanar arrangement of coupler 26 of FIG. 3. Waveguides $11_1$–$11_N$ include input ports $15_1$–$15_N$ adjacent to a first end of waveguides $11_1$–$11_N$, and output ports $16_1$–$16_N$ adjacent to a second end of waveguides $11_1$–$11_N$. To achieve sufficient coupling between waveguides $11_1$–$11_N$, spacing 13 between any pair of immediately adjacent waveguides $11_i$ and $11_{i\pm1}$ should preferably be a fraction of the width of individual waveguides $11_1$–$11_N$, and coupling region or length 14 should preferably be at least twice the 3-dB coupling length of waveguides $11_1$–$11_N$. The 3-dB coupling length is defined as the length of a pair of adjacent waveguides $11_i$ and $11_{i\pm1}$ necessary to allow half of the input signal introduced into one of waveguides $11_i$ or $11_{i\pm1}$ to be transmitted to the other waveguide $11_{i\pm1}$ or $11_i$, respectively.

When an optical signal of a predetermined frequency band, for example, substantially less than 100 gigahertz, is introduced to one of the input ports $15_1$–$15_N$, coupling occurs between each of the waveguides $11_1$–$11_N$ to yield a nonuniform power distribution at output ports $16_1$–$16_N$. This nonuniform output power distribution can be used to an advantage or made substantially uniform by several means.

In accordance with a first embodiment of the present invention, the application of an optical signal of a predetermined narrow frequency band, e.g. appreciably less than 100 gigahertz, to any one of waveguide input ports $15_1$–$15_N$ of FIG. 1 is found to produce a nonuniform power distribution among output ports $16_1$–$16_N$. The distribution of an input signal's power to output ports $16_1$–$16_N$ of coupler 10 is dependent on both the frequency of the input signal and the position of waveguide $11_i$, the waveguide to which the input signal is introduced, relative to the other waveguides. For example, if an optical signal of a specific frequency is applied to input port $15_3$, a unique nonuniform power distribution appears at output ports $16_1$–$16_N$. If an optical signal of the same frequency is applied to an input port other than input port $15_3$, or if an optical signal of a substantially different frequency is applied to the same port $15_3$, a different nonuniform power distribution is produced at output ports $16_1$–$16_N$. Experimentally determining how optical signals of different frequencies, introduced at each of input ports $15_1$–$15_N$, will appear with sufficient power at only certain output ports $16_1$–$16_N$ enables the use of the present invention as a selective switching device.

In accordance with a second embodiment of the present invention, the application of a predetermined broadband optical signal to any one of the waveguide input ports $15_1$–$15_N$ of FIG. 1 produces a uniform output power distribution at output ports $16_1$–$16_N$. The propagation constant of waveguides $11_1$–$11_N$ varies in the frequency domain of an applied signal, and changes in propagation constants of waveguide material results in changes in the distribution of power among output ports $16_1$–$16_N$. Therefore, each frequency component of the predetermined broadband optical signal generates a distinct power distribution among output ports $16_1$–$16_N$ as described above for the predetermined narrow frequency band optical signal. For example, if a single frequency component of a predetermined broadband optical signal is applied to input port $15_4$, a unique nonuniform output power distribution results wherein, for example, output port $16_6$ receives two-fifths of the input signal's power and output port $16_1$ receives one-third of the power while the remaining output ports receive the remainder of the power. Each of the other frequency components of this predetermined broadband optical signal, when applied to the same input port $15_4$, produces a different output power distribution. Averaging these different power distributions over the entire broadband of the optical input signal on exemplary input port $15_4$ yields an appreciably uniform output power distribution. Therefore, if an input signal that possesses a broad range of frequency components, for example, appreciably broader than 100 gigahertz, is introduced to an input port $15_i$, the average of the different output power distributions yields a substantially uniform power distribution among output ports $16_1$–$16_N$ of coupler 10.

Figure 2:
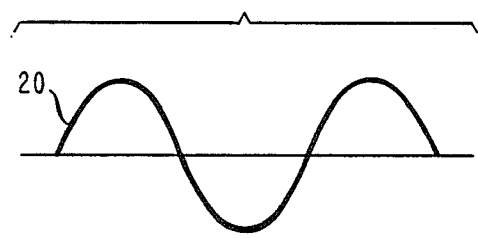
FIG. 2 illustrates two exemplary alternative waveforms of a force field to be applied across the coupling region of the waveguides in FIG. 1 for one embodiment of the present invention.
Figure 2:
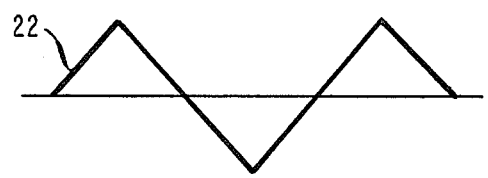

A third embodiment of the present invention uses the application of a high-frequency, continuously changing magnitude, oscillatory electric or magnetic field 17 throughout coupling region 14 of optical waveguides $11_1$–$11_N$ to produce an appreciably uniform power distribution among output ports $16_1$–$16_N$, applied field 17 originating from source 18. This embodiment requires that waveguides $11_1$–$11_N$ be made of electrooptic material, e.g. lithium niobate, in the case of applied electric field 17 or magnetooptic material, e.g. yttrium iron garnet, in the case of applied magnetic field 17. The electric or magnetic field oscillation can be in the form of a triangular wave, a sinusoidal wave, or other waves which have continuously changing magnitudes; a square wave is an example of a wave that is not desirable because its magnitude does not change continuously. The continuously changing magnitude of applied field 17 causes instantaneous variations in the propagation constant and coupling coefficients of the field sensitive waveguide material and, in turn, instantaneous variations in the output power distribution of coupler 10. The instantaneous variations in the output power distributions averaged over the period of the input signal, the period being the length of a bit of optical information, can yield a substantially uniform power distribution among output ports $16_1$–$16_N$ of waveguides $11_1$–$11_N$ depending on the frequency of applied field 17 relative to the bit rate of the input signal. In general, a sinusoidal waveform 20 shown in FIG. 2 when applied throughout coupling region 14 should have a frequency of one or at least two times the bit rate—the number of bits per unit of time—of the incoming optical signal. In the case of triangular waveform 22 shown in FIG. 22, applied field 17 should have a frequency greater than or equal to the bit rate of the incoming optical signal. There is a difference in the lower bound frequency requirements of waveforms 20 and 22, because waveforms 20 and 22 have different slope characteristics which affect the way in which waveguides $11_1$–$11_N$ experience coupling. Moreover, the higher the frequency and the greater the magnitude of applied field 17, the greater the uniformity in the power distribution of the output ports $16_1$–$16_N$ will be.

The second and third embodiments of the present invention produce near uniform power distributions among output ports $16_1$–$16_N$. The power distribution is substantially uniform for all output ports except output port $16_h$ of waveguide $11_h$ which receives the optical input signal at its input port $15_h$. For example, if input port $15_2$ of FIG. 1 is used to introduce an optical signal to coupler 10, the output power observed at output port $16_2$ would not be equal to the power found at any of the other output ports. In general, the equation that describes the output power distribution for each of the waveguides other than that of the input waveguide, e.g. waveguide $11_2$, is $$P_o = [1/(N+1)]P_i$$

where $P_i$ is the input power and $P_o$ is the output power. The power at the output port of the input waveguide, e.g. exemplary waveguide $11_2$, is the remainder of the input power that has not been distributed among the other output ports or simply two times the output power at any one of the other output ports, $[2/(N+1)]P_i$.

Coupler 26 of FIG. 3 mentioned above as an exemplary alternate design of coupler 10 includes an arrangement of an arbitrary number of waveguides greater than three, in this case twelve waveguides $30_1$–$30_{12}$ arranged in a bundle in such a way to allow sufficient evanescent wave coupling among all waveguides $30_1$–$30_{12}$. The embodiments of coupler 10 can be applied directly to coupler 26 or any other design that consists of a plurality of waveguides wherein the waveguides are sufficiently close to one another to facilitate evanescent wave coupling. Coupler 26 produces a nonuniform output power distribution when a predetermined narrow frequency band optical signal is applied to the input ports of the waveguides $30_1$–$30_{12}$. A substantially uniform power distribution can be achieved by either applying a high frequency, continuously changing magnitude, oscillatory electric or magnetic field 17 across coupling region 14 of waveguides $30_1$–$30_{12}$ where waveguides $30_1$–$30_{12}$ are made of electrooptic material in the case of an applied electric field 17 or magnetooptic material in the case of an applied magnetic field 17, or introducing a predetermined broad frequency band input to any one of the input ports of coupler 26.

What is claimed is:

1. An optical coupler comprising:
    a plurality of N single-mode optical waveguides arranged in a mutually adjacent relationship wherein each waveguide is disposed sufficiently close to at least one other waveguide to experience evanescent wave coupling in a predetermined coupling region, and includes a separate input and output port, and N>3; and
    means for applying a field throughout the coupling region of the plurality of waveguides that will vary both (1) propagation constants for each waveguide and (2) coupling coefficients among the waveguides to distribute an input signal, comprising an optical signal of a predetermined narrow frequency band, propagating in one of the plurality of waveguides among all of the plurality of waveguides and provide a substantially uniform power distribution pattern at the output ports of the waveguides.

2. An optical coupler comprising:
    a plurality of N single-mode optical waveguides in a mutually planar parallel adjacent relationship wherein each waveguide is disposed sufficiently close to at least one other waveguide to experience evanescent wave coupling in a predetermined coupling region and includes a separate input and output port, and N>2; and
    means for applying a field throughout the coupling region of the plurality of waveguides that will vary both (1) propagation constants for each waveguide and (2) coupling coefficients among the waveguides to distribute an input signal, comprising an optical signal of a narrow frequency band, propagating in one of the plurality of waveguides among all of the plurality of waveguides and provide a substantially uniform power distribution pattern at the output ports of the waveguides.

3. An optical coupler according to claim 1 or 2 wherein:
    the waveguides are made of electrooptic material; and
    the predetermined characteristic varying means comprises a means for applying an electric field with a continuously changing magnitude and a predetermined frequency throughout a coupling region of the N waveguides sufficient to produce a substantially uniform distribution of power among the output ports of the coupler.

4. An optical coupler according to claim 3 wherein the electric field has a predetermined frequency which is equal to or greater than a bit rate of the input signal.

5. An optical coupler according to claim 1 or 2 wherein:
    the waveguides are made of magnetooptic material; and
    the predetermined characteristic varying means comprises a means for applying a magnetic field with a continuously changing magnitude and a predetermined frequency throughout a coupling region of the N waveguides sufficient to produce a substantially uniform distribution of power among the output ports of the coupler.

6. An optical coupler according to claim 5 wherein the magnetic field has a predetermined frequency which is equal to or greater than a bit rate of the input signal.

7. A method of coupling optical signals to a plurality of N single-mode optical waveguides, where N>3, arranged in a mutually adjacent relationship, with each waveguide being spaced sufficiently close to at least one other waveguide to experience evanescent wave coupling in a predetermined coupling region and including a separate input and output port, comprising the steps of:
    (a) applying an optical signal, comprising a predetermined narrow frequency band, to the input port of one of the plurality of N optical waveguides of the coupler; and
    (b) applying a field throughout the coupling region of the waveguides for varying both (1) propagation constants for each waveguide and (2) coupling coefficients among the waveguides to distribute the input signal applied in step (a) to the one input port, and propagating in the associated optical waveguide, among all of the plurality of waveguides and provide a substantially uniform power distribution pattern of the input signal at the output ports of the waveguides.

8. A method of coupling optical signals to a plurality of N single-mode optical waveguides, where N>2, arranged in a mutually planar parallel adjacent relationship, with each waveguide being spaced sufficiently close to at least one other waveguide to experience evanescent wave coupling in a predetermined coupling region and including a separate input and output port, comprising the steps of:
    (a) applying an optical signal, comprising a predetermined narrow frequency band, to the input port of one of the plurality of N optical waveguides of the coupler; and
    (b) applying a field throughout the coupling region of the waveguides for varying both (1) propagation constants for each waveguide and (2) coupling coefficients among the waveguides to distribute the input signal applied in step (a) to the one input port, and propagating in the associated optical waveguide, among all of the plurality of waveguides and provide a substantially uniform power distribution pattern of the input signal at the output ports of the N waveguides.

9. A method of coupling optical signals according to claim 7 or 8 wherein the waveguides are made of electrooptic material and:
    in performing step (b), applying an electric field with a continuously changing magnitude and a predetermined frequency throughout the coupling region of the waveguides sufficient to produce a substantially uniform distribution of power among the output ports of the coupler.

10. A method of coupling optical signals according to claim 7 or 8 wherein the waveguides are made of magnetooptic material and:

in performing step (b), applying a magnetic field with a continuously changing magnitude and a predetermined frequency throughout the coupling region of the waveguides sufficient to produce a substantially uniform distribution of power among the output ports of the coupler.

* * * * *